Patented Jan. 16, 1951

2,538,187

UNITED STATES PATENT OFFICE 2,538,187

DUST FILTER ADHESIVES

John D. Brandner, Wilmington, Del., assignor to Atlas Powder Company, Wilmington, Del., a corporation of Delaware No Drawing. Application May 10, 1949, Serial No. 92,491

3 Claims. (Cl. 252—88)

This invention relates to dust adhesive compositions suitable for impregnating or coating the porous filtering media of gas filters, and more particularly to smoke and flame resistant dust adhesive compositions suitable for said purpose.

In air conditioning, heating, and ventilation systems and the like, circulating air is often freed from air borne dust particles by conducting it through porous filtering media. Such media may comprise laminations of fine mesh wire screens, or loosely felted fibers of organic or inorganic nature, such, for example, as rock wool, animal hair, glass wool, steel wool, resinous fibers and the like. The dust removing efficiency of such filters is greatly enhanced by coating or impregnating the filtering media, by dipping, spraying, or other suitable means, with liquid compositions to which the air borne dust particles adhere. A great many liquids have been suggested and used as dust adhesive impregnants in gas filters. Heavy mineral oil is an efficient dust collector in such systems but the places in which filters impregnated therewith can be used are limited because of its inflammability. The risk of having a readily inflammable material in a duct under a forced draft of air in case fire should break out is at once obvious. Even if the filter impregnant should not burn, it is highly desirable that it not decompose or volatilize to yield voluminous smoke when subjected to heat. Especially in places of public gathering such evolution of smoke from a locally overheated filter in the ventilating or heating system might readily cause a disastrous panic. The relatively non-inflammable tricresyl phosphate can be used only sparingly as an adhesive for dust in fibrous filters because it smokes copiously when heated even though it does not burn.

It is an object, therefore, of this invention to provide new dust adhesive compositions for gas filters.

It is a further object to provide dust adhesive compositions of improved smoke and flame resistance.

Other objects will become apparent in the course of the following description of the invention and the appended claims.

Compositions fulfilling the above objects comprise solutions of phosphoric acid or mixtures of phosphoric acid and boric acid in glycerol or mixtures of glycerol and ethylene glycol. More specifically, the said compositions comprise an acid component containing from 100% to 70% phosphoric acid, and from 0% to 30% boric acid, and a polyol component containing from 100% to 50% glycerol and from 0% to 50% ethylene glycol; the weight proportion of said acid component to said polyol component being at least 5 to 100 and not greater than 40 to 100. Within the range of compositions so defined, the preferred embodiments of this invention employ as the acid component a mixture of phosphoric and boric acids containing from 10% to 30% boric acid and as the polyol component mixtures of glycerol and ethylene glycol containing from 10% to 25% of ethylene glycol, the weight proportion of said acid component to said polyol component lying between the inclusive limits of 15 to 100 and 30 to 100.

The said compositions may be modified by the addition of other ingredients without departing from the scope of this invention. For example, the acidity of the composition may be partially neutralized to yield products of decreased corrosiveness toward certain metals. Such neutralization may be brought about by the addition of inorganic or organic bases, care being taken to avoid the formation of a compound insoluble in the medium. Suitable neutralizing bases are the ethanol amines, ammonium hydroxide, the alkali metal hydroxides, urea, and the like. Of these it is preferred to use triethanol amine. Moreover, water may be added to reduce the viscosity of the composition, or thickening agents such as, for example, methyl cellulose or hydroxyethyl cellulose may be added to increase the viscosity. Such viscosity adjustment may be desirable to control the amount of dust adhesive composition picked up by the porous filtering medium when applied by dipping, to permit spraying of filters at ordinary temperatures, or to minimize the draining away of too fluid compositions from filters in use.

By way of illustration the following non-limiting examples of compositions in accordance with this invention are presented.

| Example No. | Parts by Weight of— | | | | |
|---|---|---|---|---|---|
| | 95% Glycerol | Ethylene Glycol | 85% $H_3PO_4$ | $H_3BO_3$ | Modifier |
| I | 100 | | 20 | | |
| II | 100 | | 15 | 10 | |
| III | 75 | 25 | 10 | 10 | |
| IV | 75 | 25 | 10 | 10 | 15 Triethanol amine. |
| V | 80 | 20 | 25 | 10 | 20 29% ammonia. |

The compositions of this invention may be prepared by any suitable method. Simple mixing of all the ingredients until solution is complete will suffice. When a neutralizing agent is employed, it is preferred to dissolve the acid component in the polyol component first and then neutralize. The solution of boric acid may conveniently be hastened by the application of heat. When heat is used, or even in the cold, partial esterification of the inorganic acid component with the polyols may occur. Mixtures containing such partial esters along with unreacted polyol and acid are included within the scope of the present invention.

What is claimed is:

1. A liquid dust catching adhesive composition consisting essentially of a solution of from about 5 to about 40 parts of an acid component consisting of from 100% to 70% phosphoric acid and from 0% to 30% boric acid in 100 parts of a polyol component consisting of from 90% to 75% glycerol and from 10% to 25% ethylene glycol.

2. A liquid composition as in claim 1, wherein the acidity is partially neutralized.

3. A liquid dust catching adhesive composition consisting essentially of a solution of from 15 to 30 parts of an acid component consisting of from 90% to 70% phosphoric acid and from 10% to 30% boric acid in 100 parts of a polyol component consisting of from 90% to 75% glycerol and from 10% to 25% ethylene glycol.

JOHN D. BRANDNER.

REFERENCES CITED

The following references are of record in the file of this patent:

UNITED STATES PATENTS

| Number | Name | Date |
|---|---|---|
| 1,700,739 | Klinger et al. | Feb. 5, 1929 |
| 2,386,183 | Balcar | Oct. 9, 1945 |

FOREIGN PATENTS

| Number | Country | Date |
|---|---|---|
| 554,158 | Great Britain | June 23, 1943 |